US006395678B1

(12) United States Patent
Summers, Jr. et al.

(10) Patent No.: US 6,395,678 B1
(45) Date of Patent: May 28, 2002

(54) BEAD AND PROCESS FOR REMOVING DISSOLVED METAL CONTAMINANTS

(75) Inventors: Bobby L. Summers, Jr., Hudson; Karen L. Bennett, Cleveland Heights; Scott A. Foster, Strongsville, all of OH (US)

(73) Assignee: Aero-Terra-Aqua Technologies Corporation, Cleveland, OH (US)

( * ) Notice: Subject to any disclaimer, the term of this patent is extended or adjusted under 35 U.S.C. 154(b) by 0 days.

(21) Appl. No.: 09/387,978

(22) Filed: Sep. 1, 1999

(51) Int. Cl.⁷ .......................... B01J 31/06; B01J 20/02; B01J 20/28
(52) U.S. Cl. .................. 502/416; 502/159; 502/401; 502/402; 502/417; 502/418; 502/419
(58) Field of Search ................. 502/159, 401, 502/402, 416, 417, 418, 419

(56) References Cited

U.S. PATENT DOCUMENTS

| | | |
|---|---|---|
| 3,289,847 A | 12/1966 | Rothemund |
| 3,375,933 A | 4/1968 | Rodman |
| 3,420,709 A | 1/1969 | Barrett, Jr. et al. |
| 3,914,901 A | 10/1975 | Muldner |
| 3,925,192 A | 12/1975 | Randall et al. |
| 3,948,791 A | 4/1976 | Tominaga et al. |
| 3,950,251 A | 4/1976 | Hiller |
| 4,013,585 A | 3/1977 | Terajima et al. |
| 4,032,457 A | 6/1977 | Matchett |
| 4,033,729 A | 7/1977 | Capes et al. |
| 4,067,821 A | 1/1978 | Votapek et al. |
| 4,081,402 A * | 3/1978 | Levy et al. ............. 428/365 |
| 4,218,280 A | 8/1980 | Philipp et al. |
| 4,234,420 A | 11/1980 | Turbeville |
| 4,239,865 A | 12/1980 | Tarao et al. |
| 4,293,333 A | 10/1981 | Drobot |
| 4,293,334 A | 10/1981 | Drobot |
| 4,352,883 A | 10/1982 | Lim |
| 4,357,780 A | 11/1982 | Ball |
| 4,414,776 A | 11/1983 | Ball |
| 4,427,775 A | 1/1984 | Chen et al. |
| 4,459,149 A | 7/1984 | Moran et al. |
| 4,563,425 A | 1/1986 | Yoshioka et al. |
| 4,626,416 A | 12/1986 | DeVoe et al. |
| 4,664,683 A | 5/1987 | Degen et al. |
| 4,690,894 A | 9/1987 | Brierley et al. |
| 4,753,728 A | 6/1988 | VanderBilt et al. |
| 4,876,287 A | 10/1989 | Babcock et al. |
| 4,908,137 A | 3/1990 | Chen et al. |
| 4,909,944 A | 3/1990 | Jackson et al. |
| 4,992,180 A | 2/1991 | Onodera et al. |
| 5,017,318 A | 5/1991 | Vanderbilt et al. |
| 5,019,311 A | 5/1991 | Koslow |
| 5,024,764 A | 6/1991 | Holler |
| 5,064,534 A | 11/1991 | Busch et al. |
| 5,096,946 A | 3/1992 | Rainer |
| 5,108,614 A | 4/1992 | Ross et al. |
| 5,147,722 A | 9/1992 | Koslow |
| 5,189,092 A | 2/1993 | Koslow |
| 5,206,206 A | 4/1993 | Buelna et al. |
| 5,249,948 A | 10/1993 | Koslow |
| 5,279,745 A | 1/1994 | Jeffers et al. |
| 5,331,037 A | 7/1994 | Koslow |
| 5,354,345 A | 10/1994 | Nehls, Jr. |
| 5,371,110 A | 12/1994 | Philipp et al. |
| 5,527,451 A | 6/1996 | Hembree et al. |
| 5,534,154 A | 7/1996 | Gillham |
| 5,578,547 A | 11/1996 | Summers, Jr. et al. |
| 5,597,489 A | 1/1997 | Schneider et al. |
| 5,602,071 A * | 2/1997 | Summers, Jr. et al. ...... 502/401 |
| 5,603,987 A | 2/1997 | Lisenko |
| 5,679,248 A | 10/1997 | Blaney |
| 5,997,829 A * | 12/1999 | Sekine et al. ............. 423/210 |
| 6,077,809 A * | 6/2000 | Suzuki et al. ............. 502/400 |
| 6,133,193 A * | 10/2000 | Kajikawa et al. ........... 502/402 |

FOREIGN PATENT DOCUMENTS

| | | |
|---|---|---|
| CA | 2150076 | 6/1999 |
| WO | WO 91/05859 | 5/1991 |

OTHER PUBLICATIONS

KX Industries, L.P., MATRIKX +5 Extruded Activated Carbon Block Filter Brochure, p. 1–2, Date: First Quarter 1996, No Month.

KX Industries, L.P., MATRIKX® 10 Extruded Activated Carbon Block Filter Brochure, p. 1–2, Date: First Quarter 1997, No Month.

KX Industries, L.P., MATRIKX® CR1 Extruded Activated Carbon Block Filter Brochure, p. 1–2, Date: First Quarter 1997, No Month.

KX Industries, L.P., MATRIKX Pbl Extruded Activated Carbon Block Filter Brochure, p. 1–2, Date: 1996, No Month.

KX Industries, L.P., MATRIKX +CTO®/2 Extruded Activated Carbon Block Filter Brochure, p. 1–2, Date: Fourth Quarter 1996, No Month.

KX Industries, L.P., UNI–LINKX The Universal In Line Filter Brochure, p. 1–2, Date: Fourth Quarter 1996, No Month.

KX Industries, L.P., CERAMIKX™ All–Carbon, Sub–Micron Performance Brochure, p. 1–2, Date: First Quarter 1997, No Month.

(List continued on next page.)

Primary Examiner—Elizabeth D. Wood
(74) Attorney, Agent, or Firm—Pearne & Gordon LLP

(57) ABSTRACT

A bead is provided which comprises or consists essentially of activated carbon immobilized by crosslinked poly(carboxylic acid) binder, sodium silicate binder, or polyamine binder. The bead is effective to remove metal and other ionic contaminants from dilute aqueous solutions. A method of making metal-ion sorbing beads is provided, comprising combining activated carbon, and binder solution (preferably in a pin mixer where it is whipped), forming wet beads, and heating and drying the beads. The binder solution is preferably poly(acrylic acid) and glycerol dissolved in water and the wet beads formed from such binder solution are preferably heated and crosslinked in a convection oven.

26 Claims, 2 Drawing Sheets

OTHER PUBLICATIONS

KX Industries, L.P. conneKXions, vol. 2, No. 1, p. 1–4, Spring 1997, No Month.

KX Industries, L.P., Matrikx™ Extruded Carbon Filters Brochure, p. 1–3, 1996, No Month.

KX Industries, L.P., MATRIKX 1 Extruded Activated Carbon Block Filter, p. 1–2, Date: Fourth Quarter 1996, No Month.

Jeffers, T.H., et al., Biosorption of Metal Contaminants Using Immobilized Biomass—A Laboratory Study, Report of Investigations 9340, U.S. Dept. of Interior, Bureau of Mines (1992), No Month.

Jeffers, T.H., et al., "Wastewater remediation using bio–fix bead technology", Environmental Issues and Waste Management in Energy and Mineral Production, (1992), pp. 1379–1387, No Month.

Bloom, P.R. and McBride, M.B., "Metal Ion Binding and Exchange with Hydrogen Ions in Acid–Washed Peat", Soil Science Soc. Am. J., vol. 43 (1979), pp. 687–692, No Month.

Smith, E.F., et al., "Sulfuric Acid Treatment of Peat for Cation Exchange", *Journal WPCF*, Apr. 1977, pp. 633–638.

BIO–FIX Water Treatment Systems brochure from Harrison Western Environmental Services, (1991), pp. 1–4, No Month.

Mars Mineral MMC Pin Mixer brochure for MMC Mars Mineral, Mars, Pennsylvania (1985), pp. 1–2, No Month.

* cited by examiner

BEAD AND PROCESS FOR REMOVING DISSOLVED METAL CONTAMINANTS

BACKGROUND OF THE INVENTION

The present invention relates generally to beads, methods of making beads, and methods of using beads to remove metal and other ionic contaminants dissolved in aqueous solutions. The beads preferably include activated carbon and a binder and the activated carbon, and preferably the binder, are capable of sorbing dissolved metal ions.

DESCRIPTION OF RELATED ART

The removal of metal contaminants from aqueous wastes such as acid mine drainage/water and industrial waste water such as metal finishing waste water and municipal waste water, is an important environmental and economic issue. Some of the metal ions are toxic and some are valuable. In the chemical area of toxic metal recovery from dilute aqueous steams, the techniques of recovery have most commonly been by chemical precipitation, ion exchange, reverse osmosis, electrodialysis, solvent extraction (liquid ion exchange), and chemical reduction. (See U.S. Pat. No. 5,279,245). However, these procedures are characterized by the disadvantages of incomplete metal removal, high reagent and energy requirements, and generation of toxic sludge or other waste products that must be disposed of, and these disadvantages are particularly conspicuous at the low metal concentrations often encountered in waste waters, where federally-mandated cleanup standards dictate that effluents discharged to public waters generally contain less than 1 mg/L of metals such as copper, zinc, cadmium, lead, mercury and manganese.

Thus there exists a need for a more effective metal ion sorbent immobilized in a matrix in a mechanical shape such as a bead and for an effective, less-hazardous method of making such beads using binders or matrix materials which do not involve hazardous materials. Preferably the binder or matrix material itself is capable of sorbing The sorbent should be able to remove contaminants from both wastewater and potable water. There is a further need for a process which makes beads which are uniformly spheroidal. Non-spheroidal beads tend to pack asymmetrically, tending to cause water flowing there-through to flow in certain channels, rather than uniformly over all the beads. Among the objects of the present invention are to answer these needs.

SUMMARY OF THE INVENTION

A bead is provided which comprises activated carbon and a binder, the binder preferably being poly(carboxylic acid) effectively crosslinked with a crosslinking agent. The activated carbon is effectively immobilized in the bead. The bead is capable of sorbing a metal or other ions dissolved in a dilute aqueous solution at a concentration of less than 10 ppm, said metal or ion being selected from the group consisting of lead, copper, silver, chromium, cobalt, uranium, mercury, nickel, arsenic, aluminum, cadmium, iron, manganese, and zinc. A method of making a metal-ion-sorbing bead is also provided. The method comprises:
  (a) combining, activated carbon, such as bituminous coal-based powdered carbon, and binder solution into a mixture, the binder solution comprising poly (carboxylic acid) and a crosslinking agent;
  (b) forming the mixture into a first bead;
  (c) heating said first bead to effectively crosslink the poly(carboxylic acid) with the crosslinking agent to form an effectively crosslinked binder.

A method of using the bead for removing a metal or metalloid from a dilute aqueous solution is also provided.

DETAILED DESCRIPTION OF THE PREFERRED EMBODIMENTS OF THE INVENTION

Figure 1:
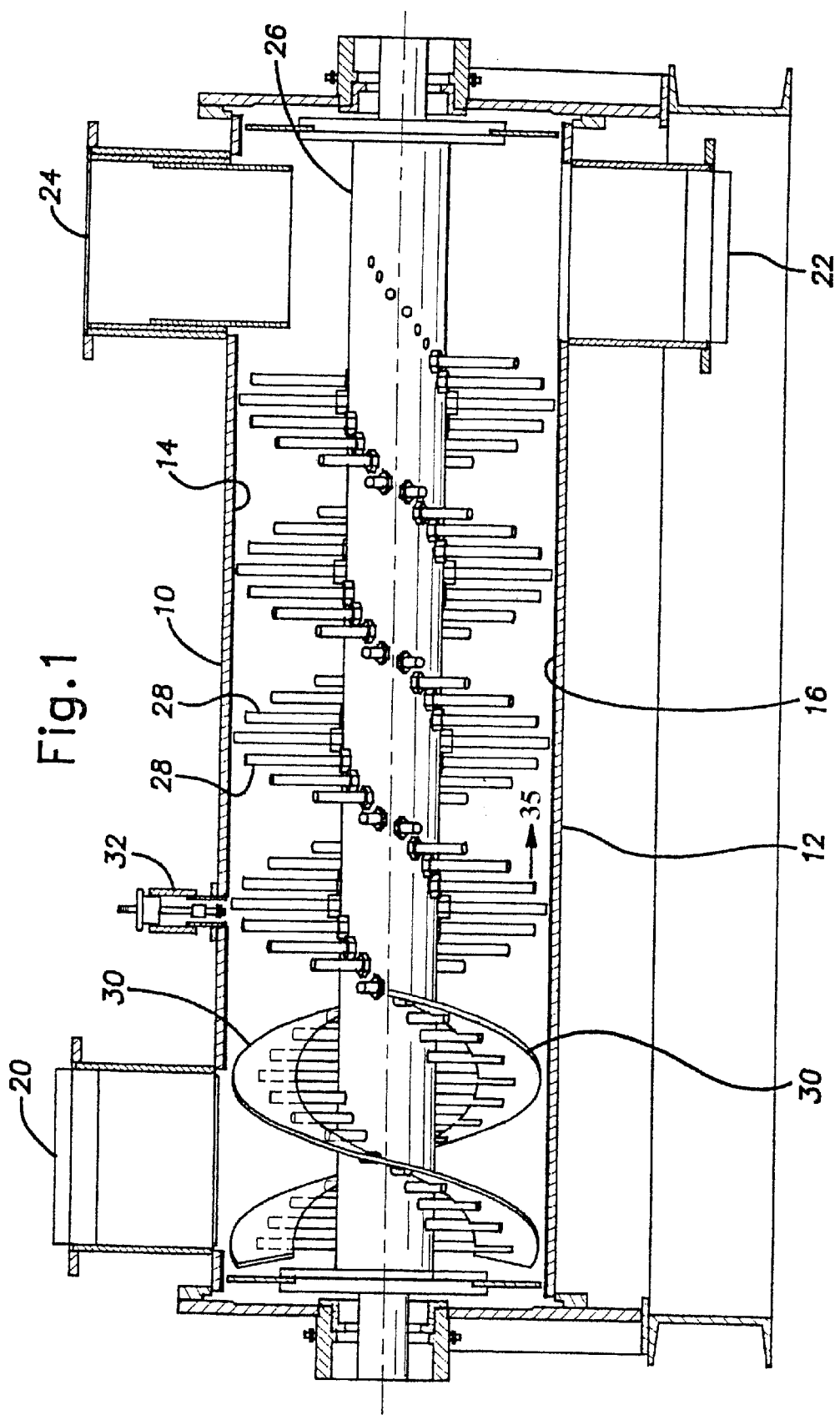
FIG. 1 is an elevational view with the exterior in section of a pin mixer for use in the present invention.

The terms sorb, sorbing, and sorption are used in the broad sense and as used herein are defined to include all forms of metal and other contaminant uptake and attachment, whether by adsorption, absorption, ionic bonding (including ion exchange), among other forms of metal uptake and attachment. Parts per million (ppm) and parts per billion (ppb) are parts by weight.

As used herein, the following terms have the following meanings. "Poly(carboxylic acid)" means a polymer including monomeric units which have a carboxylic acid functional group. The preferred poly(carboxylic acid) of the present invention is poly(acrylic acid). "Polyalcohol" means an organic compound that contains more than one hydroxy group. Glycerol and ethylene glycol are polyalcohols. The beads of the present invention includes poly(carboxylic acid) beads, sodium silicate beads, and polyamine beads, as further described herein.

The preferred binder solution is poly(carboxylic acid) and a crosslinking agent in water. The crosslinking agent crosslinks the poly(carboxylic acid) as described hereinafter. The poly(carboxylic acid) is preferably poly(acrylic acid), less preferably poly(methacrylic add), less preferably those poly(carboxylic adds) which are like poly(acrylic acid) but which have fewer carboxylic acid functional groups per carbon chain length. More carboxylic acid functional groups per unit weight is advantageous, since there is more metal ion uptake capacity per unit weight. The poly(carboxylic acid) utilized preferably has a molecular weight of at least 10,000 and preferably not more than 500,000. More preferably the molecular weight is at least 80,000 and not more than 400,000, more preferably between 200,000 and 300,000. The preferred poly(carboxylic acid) is poly(acrylic acid), which is available from BF Goodrich Specialty Chemicals Cleveland, Ohio, as Carbopol ISX-1794 (unneutralized version)(this product is, by weight, 75% water and 25% poly(acrylic acid) with the poly(acrylic acid) having a molecular weight of about 250,000, which is preferable). The crosslinking agent is preferably polyalcohol. The polyalcohol is preferably glycerol, less preferably ethylene glycol, 1,2-propanediol, or 1,3-propanediol, less preferably poly(vinyl alcohol). The crosslinking agent is less preferably a polyamine, such as poly(ethylene imine), a tri-amine, or a diamine such as diamino butane.

The activated carbon to be used in the present invention is preferably a powdered bituminous coal-based activated carbon (PAC). If the end product is intended for use with potable water, the carbon should be specifically designated for the use in the treatment of potable water and have ANSI/NSF certification. Such carbon is available from Calgon Carbon Corporation, called WPH powdered activated carbon. Other less preferable types of carbons include coconut shell based and wood based carbon. The carbon should have a minimum Iodine Number of 600 mg/g, more preferably 700 mg/g, most preferably 800 mg/g or higher. The pH associated with the carbon is preferably neutral or slightly acidic, less preferably basic.

The preferred binder solution is, by weight, about 60–98%, more preferably about 75–85%, water, about 2–40%, more preferably about 5–20%, more preferably about 10–15%, poly(carboxylic acid), and about 0.1–15%, more preferably about 0.5–3%, more preferably about 1–2% polyalcohol or other crosslinking agent. A preferred binder solution is, by weight, about 0.1–15%, more preferably about 0.5–3%, more preferably about 1–2%, glycerol, about 2–40%, more preferably about 5–20%, more preferably about 10–15% poly(acrylic acid), and about 60–98%, more preferably about 75–95%, more preferably about 80–85% water. A preferred binder solution, by weight, is 1.0% glycerol, 57.3% Carbopol ISX-1794 (unneutralized, which is 75% water), and 41.7% water, mixed at room temperature (72° F.).

A less preferred binder solution is a solution of sodium silicate in water. A starting material for this is product STIXSO RR from The PQ corporation Valley Forge, Pa. 19482, which is by weight 9.2% Na2O, 30% $SiO_2$, and 6.8% water. Product STIXSO RR is diluted at 70°–85° F. with water (preferably about 264 g STIXSO RR to 1000 g water, although it may be made more or less diluted) to provide the binder solution. Another sodium silicate starting material is Sodium Silicate N from The PQ corporation, which is 8.9% Na2O, 28.7% $SiO_2$, and 62.4% water.

An alternative binder solution is polyamine and a crosslinking agent in water. The polyamine is preferably polyethylenimine (preferably 60,000–100,000 MW) and the crosslinking agent is preferably a dicarboxylic acid where the two groups are joined by a straight-chain alkane radical and each acid group is located at a terminal carbon, preferably glutaric acid, less preferably succinic acid, less preferably malonic acid. The polyethylenimine can be utilized in some applications with out the crosslinking agent. A preferred binder solution is, by weight, 5–40% preferably 12–27%, more preferably 18%, polyethylenimine, 0–3%, more preferably 0.3–2%, more preferably 0.5%, glutaric acid, and the balance water. The invention is preferably made from a powdered activated carbon, which is agglomerated with the binder to the desired size of the final product. This powdered carbon is preferably 90% smaller than 100 mesh, more preferably 90% smaller than 200 mesh, and most preferably 90% smaller than 325 mesh. The product can be made from a granular carbon in which case the raw material carbon is near the size range of the desired end product. This size is typically in the range of −20+50 mesh, therefore the starting carbon should be in that same range or slightly smaller, such as −40+80 mesh.

The screened activated carbon and binder solution are preferably mixed and processed in an apparatus for mechanical spheronization to yield the mechanical shapes of granules or beads disclosed herein. An apparatus for mechanical spheronization produces spheroidal beads or granules. As used in the specification and claims, an apparatus for mechanical spheronization includes a pin mixer, and an Eirich mixer in combination with a disk pelletizer or spheronizer. The activated carbon is preferably fed via a regulated screw feeder such as an Accuson screw feeder to a pin mixer. A preferred pin mixer is available from MMC Mars Mineral, P.O. Box 719, Mars, Pa. 16046, such as their Model 12D45L or Model 8D36L. Pin mixers are known devices, the details of which are known and are incorporated by reference. With reference to FIG. 1, the pin mixer has a cylindrical, stationary shell horizontally oriented with a length-to-diameter ratio of preferably between 2 and 5. Upper hemispherical shell 10 and lower hemispherical shell 12 form the cylindrical shell. Upper hemispherical shell 10 may be hinged so the mixer may be opened. The interior surfaces of the shells 10 and 12 are lined with sheet rubber 14 and 16. Inside the shell along its central axis is a shaft 26 with radially-extending rows of metal pins or rods 28. The pins 28, which are means to impart high shear forces are arranged in a staggered, overlapping double helical pattern and extend into the chamber when the mixing takes place, the mixer shell enclosing the chamber. There is a close tolerance between the tips of the pins and the inside of the mixer shell, for example. 3/16 inch. Shaft rotational speed, and therefore tip speed, is high (several hundred RPM, a typical speed being 900 to 1700 RPM.) Optionally, a vent 24 may be provided. The pin mixer imparts high shear forces (particularly by means of its pins) and rotational forces as well as plug flow characteristics to the material being mixed.

The activated carbon is entered at inlet 20, moved forward by vanes 30, and the liquid binder solution is sprayed onto the activated carbon from nozzle 32. Additional nozzles can optionally be placed at other positions along the top of shell 10. The injection pressure of binder solution is preferably about 15 PSI, but will vary depending on viscosity. Preferably about 150 lbs. of the above-referenced 57.3% Carbopol, 1.0% glycerol solution is added per 100 lbs. of activated carbon, depending on moisture content of the activated carbon.

Preferably the material inside the pin mixer is 140°–170° F.; generally it takes about 20 minutes of operation to get to this temperature (frictional forces leading to temperature rise). Alternatively steam may be injected to raise the temperature or other means may be used.

The activated carbon/binder solution mixture or media is whipped and mixed and rapidly stirred and high shear forces are imparted with rigid members in an air atmosphere (and not underwater) by the pins 28 as it moves as a plug flow or with plug flow through the shell in the direction indicated by arrow 35 to the bottom outlet 22, where it exits in the fore of wet spheroidal beads or granules (typically about 0.3 to 1.0 mm in diameter) having a temperature typically of about 160° F., and a moisture content, for poly(carboxylic acid) binder solution, of preferably about 45–60% by weight, and a moisture content for sodium silicate binder solution, of preferably about 60–70%, more preferably 65–68%, more preferably 66% by weight.

It is important to control three variables: dry feed rate (rate at which activated carbon is fed in), binder feed rate (rate at which binder solution is added), and the temperature of the material inside the mixer (this temperature being largely influenced by the RPM rate, due to frictionally generated heat). These rates will vary depending on a number of factors, principally the size of the pin mixer. Preferably, a pressure gauge and temperature gauge are installed on the cylindrical shell to monitor operating conditions and parameters.

One advantage of a pin mixer is that residence time or retention time of the material in the mixer is controlled and limited, since the material moves as a plug flow down a path and then exits.

Alternatively, the wet beads may be produced by processing the activated carbon and binder solution through an Eirich mixer and then through a disk pelletizer or spheronizer. An Eirich mixer is a high shear mixer available from the Eirich Company in Germany. The details and operation of an Eirich mixer are known and readily available and are incorporated by reference. It has a bowl or chamber in which the activated carbon and binder solution are placed. The bowl turns in one direction and an S-shaped blade which descends into the bowl rotates at a high speed in the other direction, mixing and whipping and rapidly stirring with a rigid member the contents of the bowl and imparting high shear forces to the mixture. The Eirich mixer produces wet beads which typically are misshapen and not sufficiently round. The beads are then preferably taken from the Eirich mixer and are placed in an apparatus to improve the spheroidalness of the wet spheroidal beads. Suitable such apparatus include a disk pelletizer available from MMC Mars Mineral, and a spheronizer available from Niro, Inc., Columbia, Md. The details and operation of these devices are known and readily available and are incorporated by reference.

The wet poly(carboxylic acid) beads after exiting the pin mixer or apparatus for improving spheroidalness are heated to crosslink the poly(carboxylic acid) using the polyalcohol or other crosslinking agent to form a tough, strong, resilient, water insoluble, polymeric, plastic matrix or binder or structure for the bead. The activated carbon is effectively immobilized in the bead so that the bead may perform effectively. When the crosslinking agent is polyalcohol, the alcohol functional group reacts with the carboxylic acid functional group to form a linkage, which reaction is repeated at many sites, yielding an ester crosslinked poly (carboxylic acid). Preferably, only the minimum number of carboxylic acid function groups are utilized in forming ester links or other links, since those remaining are then available for ion exchange, that is, metal ion uptake or sorption. Thus the amount of polyalcohol or other crosslinking agent used should be minimized. The poly(carboxylic acid) is effectively crosslinked when sufficient ester or other types of linkages have been formed to provide a polymeric matrix which provides effective structural support for the bead. If the crosslinking agent is a polyamine, the polyamine reacts with the poly(carboxylic acid) to form amide crosslinks. Too much crosslinking leads to brittleness and less ion exchange capacity, too little crosslinking leads to insufficient structural support. The extent of crosslinking can be controlled by varying the heating method, the heating time, the heating temperature, and the concentrations of the reactants.

The heating/crosslinking step for the wet poly(carboxylic acid) bead is preferably carried out by heating in a convection oven or other heating means. In a convection oven the crosslinking step is preferably carried out at a temperature of about 250°–350° F. for about 2 to 3 hours. Heating time depends principally on the temperature selected and initial moisture content of the beads. In a preferred process, heating is at 300° F. for 2 hours in a convection oven, with the beads having a moisture content of about 1% by weight when the reaction is done. Alternatively the crosslinking step can he accomplished using other means, such as a hot air dryer, a TURBO-Dryer as discussed herein, or a tumble dryer.

After the crosslinking step, the beads are preferably separated by size into large (retained on U.S. Standard Sieve No. 20), small (passes through US. Standard Sieve No. 50), and medium (passes through No. 20 above but is retained on No. 50 above, i.e. −20+50 mesh). The beads may thereafter be stored dry and are believed to have an indefinite shelf life.

The poly(carboxylic acid) beads preferably have the following physical characteristics: relatively spheroidal, bulk density—about 20–25 lbs/ft³, 0 to 10, more preferably 0 to 5, more preferably 1 to 3 weight percent water, 65 to 94, more preferably 74 to 88, more preferably 78 to 84, weight percent activated carbon, and 4 to 25, more preferably 8 to 20, more preferably 14 to 19, weight percent crosslinked poly(carboxylic acid) binder. The poly(carboxylic acid) beads will tolerate without material damage temperatures up to 250° F., and they operate at a pH range preferably of 1.75 to 10, more preferably 4 to 9, more preferably 6.5 to 8.5. The beads have an internal porous structure so that water may penetrate and contact the activated carbon and binder throughout the bead, both the activated carbon and poly (carboxylic acid) binder having metal ion uptake capacity. This bead is more porous than the sodium silicate bead described herein. The disclosed poly(carboxylic acid) bead has advantages over the herein disclosed sodium silicate bead. It is physically stronger and more durable than the sodium silicate bead, is water insoluble, can operate at higher, temperatures, and has inherently better metal uptake capacity because the poly(carboxylic acid) binder itself has metal uptake capacity and is a cation exchange material.

Figure 2:
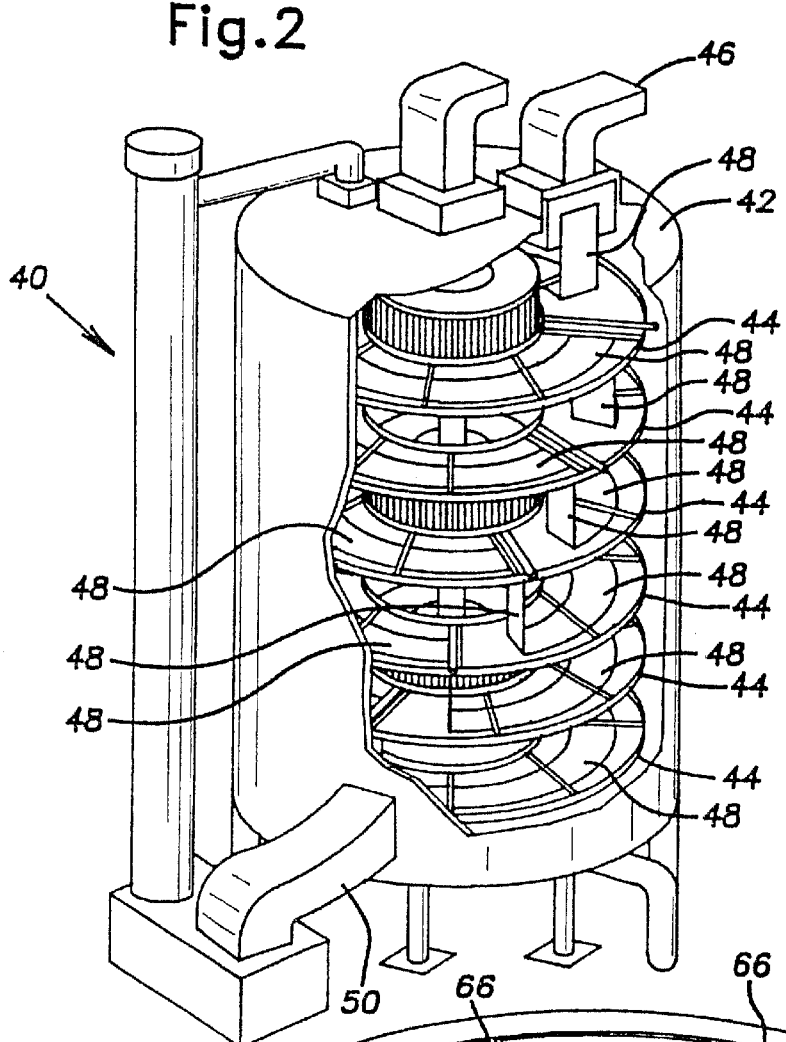
FIG. 2 is a perspective view with part of the casing cut away of a dryer for use in the present invention.
Figure 3:
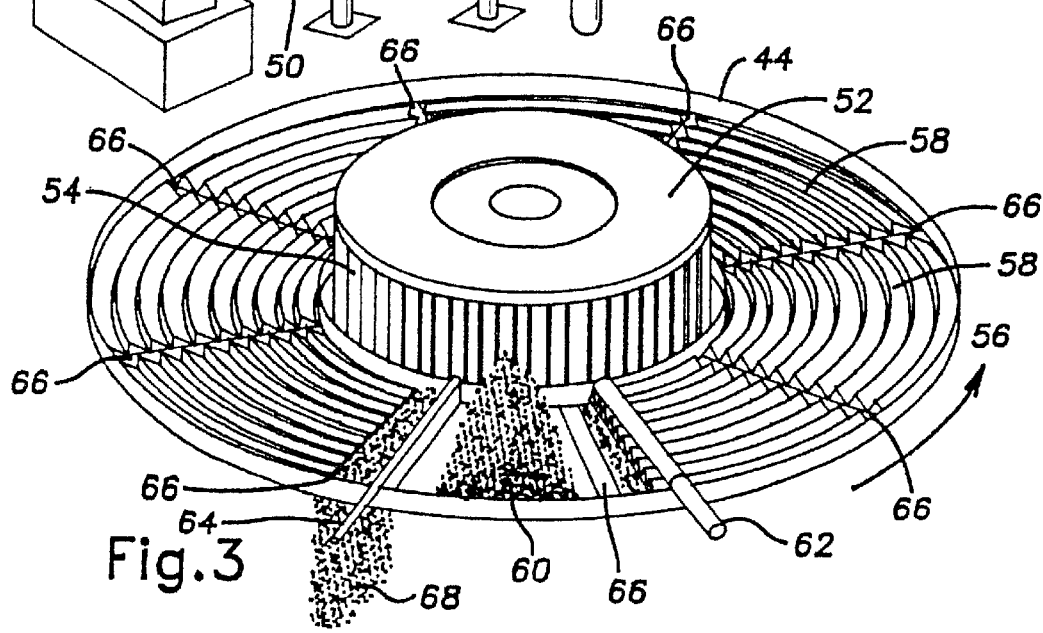
FIG. 3 is a perspective view showing in more detail one of the trays of the dryer of FIG. 2.

The wet sodium silicate beads after exiting the pin mixer or apparatus for improving spheroidalness are transported via conveyor or other means to a dryer, preferably a TURBO-Dryer available from Wyssmont Company, Inc., Fort Lee. N.J. or a dryer available from Carrier Corporation, such as their Model QAD-1260S-IO. With regard to FIGS. 2 and 3, there is shown a TURBO-Dryer 40 from Wyssmont Company, Inc. Dryer 40 has a casing 42 containing trays 44. A tray is shown in more detail in FIG. 3. The wet beads enter at inlet 46 and are transported along a pathway indicated by 48 to outlet 50. With regard to FIG. 3, the tray 44, which rotates in the direction indicated by arrow 56, has a fan 52 with blades 54 blowing hot air radially outward across the beads which are in ridged panes 58. The beads fall from the tray above to location or position 60, are leveled by stationary leveler 62, and are carried around on the tray in ridged panes 58 until they meet stationary wiper 64. Stationary wiper 64 wipes the beads from the ridged panes 58 as the ridged panes pass underneath and drops the beads through the open slots 66 as they pass beneath, the beads then dropping to the tray below, as indicated at 68.

In the TURBO-Dryer the sodium silicate beads are dried with hot air (about 200° F.) and rolled, which maintains and enhances the spheroidal shape, which is the preferred shape. Other dryers known in the art can be used, preferably those which also roll the material. The sodium silicate beads are dried to moisture content of preferably between about 5% and about 10% by weight. The beads shrink as they dry. Air drying is not preferred; it is time-consuming, inefficient and does not roll the sodium silicate beads.

The dried beads, made with any of the mentioned binders, are preferably spheroidal, less preferably globular or orbular, are then preferably screened to sort by size. Typically there are three sizes: large (passes through U.S. Standard Sieve No. 8 but is retained on U.S. Standard Sieve No. 20. i.e., −8+20), medium (−20+50), and small (−50+150), although larger and smaller beads may also be used. The openings in U.S. Standard Sieve Nos. 8, 20, 50 and 150 are approximately 2360, 850, 300, and 100 microns, respectively. These screened beads are dimensionally stable and have a bulk density of about 20–30, more preferably about 25 lbs/ft³. The density of the beads will vary with the screen sizing. Oversized beads may be ground or shredded to a smaller size and re-screened.

Other sizes of beads may be used, beyond those described above. Different applications typically require different bead sizes. Smaller beads have more surface area per pound and would tend to be preferred for lower flow rates of potable and waste water and for lower concentrations of contaminants. For higher flow rates it may be preferable to mix small and large beads together. Larger beads tend to plug or clog less and may be preferred in less accessible locations. The beads of the present invention are preferably contained within containers such as filter cartridges and other types of POU devices, nylon sacks, porous containers (such as porous plastic or polymer containers (the plastic or polymer itself being porous) made by or through Porex Technolosies of Fairburn, Ga.) and containers with filter paper or filter material at the inlet and outlet to retain the beads. Such containers, canisters, or columns are known in the art. Potable or waste water can be flowed over and/or through the beads retained within such containers.

Undersized beads or fines, such as those that pass through U.S. Standard Sieve Nos. 100 or 200, have high surface area per pound and may be used in extruded carbon blocks for potable or waste water treatment. They can also be used in air filters to remove metal contaminants from air streams, such as removing lead and heavy metals from smelter air. In this application as an air filter the fines or small particles are preferably dried and physically fixed in a matrix or container, in various forms and shapes as required by the application, and/or are enclosed such as in filter cloth. etc., or otherwise used to make an air filter the same way activated carbon is used to make an air filter, which is well-known in the art.

Preferably the beads of the present invention are used to sorb metal and metalloid ion contaminants such as silver, iron, chromium, cobalt, uranium, mercury, nickel, arsenic, aluminum, cadmium, lead, manganese, copper, zinc and others from dilute aqueous solutions (pH preferably 4 to 9, more preferably 6.5 to 8.5, temperature preferably 33°–180° F., more preferably 50°–100° F.) such as in potable water treatment devices or in waste water like acid mine drainage waters, in particular where the dissolved metals, such as heavy metals and transition metals, have concentrations less than 10 ppm, more preferably less than 1 ppm (mg/L), more preferably in the concentration range of 100 to 10 ppb. These metals and metalloids are elemental substances or elements. Such sorption is accomplished by bringing the dilute aqueous solutions into contact with the beads. The beads of the present invention are effective during relatively short contact times at 70° F. and at other temperatures, preferably 1 to 12 minutes, more preferably 2 to 6 minutes, in a fixed column. The beads of the present invention exhibit selectivity for heavy metal ions over calcium and magnesium (a useful characteristic since calcium and magnesium frequently interfere with efficiency in this art) but are operable in waste streams with high concentrations of solids or metal ions. The beads work particularly well with copper, lead, zinc, cadmium, and mercury.

The invented beads have many advantages. The activated carbon/poly(carboxylic acid) beads are physically strong, water insoluble, are made with a non-hazardous, simple process, and both the activated carbon and binder have metal ion uptake capacity. The activated carbon/poly(carboxylic acid), activated carbon/polyamine, and activated carbon/sodium silicate beads are made using non-hazardous materials and using a process which is simple, efficient, inexpensive, and which produces spheroidal beads.

It is believed that the present activated carbon/poly(carboxylic acid) beads will generally remove heavy metal ions at least as well as the activated carbon/sodium silicate beads, although either are effective. The activated carbon/polyamine beads are typically used for the removal of anionic metals complexes. The poly(carboxylic acid) and polyamine binders are generally more stable physically than the sodium silicate and may work better where the pH is 8 or higher. The poly(carboxylic acid) and polyamine beads are water-insoluble and are more temperature resistant and can operate at 120°–180° F., as well as at 32°–120° F. The sodium silicate beads are preferably used at temperatures below 120° F.; the sodium silicate binder may lose its shape and/or partially dissolve in an aqueous solution at or above 120° F.

The beads of the present invention can be effectively regenerated by (a) passing one to three, preferably two, bed volumes of 1 to 3% HCl through the bead-filled container at an upflow rate of 6–10 bed volumes per hour (BV/hr); (b) passing one to three bed volume of $H_2O$ (preferably deionized) through said container at the same rate. By this technique valuable metal contaminants can be recovered from the beads in solutions amenable to further processing, and regenerated beads can be reused. The valuable metal contaminants can subsequently be recovered from the solutions using techniques known in the art. The invented beads can be reused and cycled through the regeneration procedure many times and still be effective. It is also possible to run the beads through the above regeneration procedure prior to the time the beads are first used. This is sometimes referred to as pre-conditioning the beads. Generally it is not economical to pre-condition the beads prior to their first use. Unpre-conditioned beads, on first use, are typically about 80 to 95% as efficient as pre-conditioned beads on first use. When unpre-conditioned beads are regenerated after first use, they get to near their peak efficiency. The beads of the present invention will generally increase slightly in efficiency through the first few (up to about 7) regeneration cycles.

The following Examples illustrate various aspects of the present invention.

EXAMPLE 1

Sorbent beads were made with powdered activated carbon, poly(acrylic acid) (PAC), and glycerol, formed in a pin mixer and baked in a convection oven. The resulting beads were (by weight) 79% PAC, 19% Poly(acrylic acid), 1% glycerol, and 1% moisture. The beads were screened to collect the fraction in the −20+50 mesh range. These beads had a density of 22.8 lb/ft3. This size beads underwent a loading capacity test.

The loading capacity is tested with a high concentration lead solution to determine the amount of lead removed on a known amount of sorbent material. One gram of material was placed in a 1 L beaker with 500 ml of a lead solution containing 485.5 ppm Pb. The beads were mixed in the solution for 24 hours. At that point, the lead concentration remaining in solution was 309 ppm Pb. Therefore 1 gram of beads removed 176.5 ppm Pb from a 500 ml solution, equal to 87.7 mg/g removal, or 2.01 lb/ft3. This test demonstrates the sorbent material has a high loading capacity for lead.

EXAMPLE 2

Beads made in Example 1 were tested for kinetics with a copper solution isotherm. One gram of material was placed in a 1 L beaker with 500 ml copper solution containing 4.92 ppm Cu. The beads were mixed in solution for 4 hours. At that point, the copper concentration remaining in solution was 0.24 ppm Cu. Therefore 95.1% of the copper was removed from solution in this time period. This test demonstrates the sorbent material has fast removal kinetics for metal removal.

It should be evident that this disclosure is by way of example and that various changes may be made by adding, modifying or eliminating details or elements without departing from the fair scope of the teaching contained in this disclosure. The invention is therefore not limited to particular details of this disclosure except to the extent that the following claims are necessarily so limited.

What is claimed is:

1. A bead comprising 65–94 weight percent activated carbon and 4–25 weight percent binder, said binder being effectively crosslinked and said activated carbon being effectively immobilized in said bead, said binder being selected from the group consisting of poly(carboxylic acids) and polyamines, said bead being capable of sorbing a metal or metalloid dissolved in a dilute aqueous solution at a concentration of less than 10 ppm, said metal or metalloid being selected from the group consisting of lead, silver, copper, iron, chromium, cobalt, uranium, mercury, nickel, arsenic, aluminum, cadmium, manganese, and zinc.

2. A bead according to claim 1, wherein said binder is poly(carboxylic acid), said poly(carboxylic acid) binder being effectively crosslinked with a crosslinking agent, said crosslinking agent being a polyalcohol or a mixture of polyalcohols.

3. A bead according to claim 1, wherein said poly(carboxylic acid) is selected from the group consisting of poly(acrylic acid), poly(methacrylic acid), and mixtures thereof.

4. A bead according to claim 1, wherein said poly(carboxylic acid) is poly(acrylic acid).

5. A bead according to claim 4, wherein said poly(acrylic acid) has a molecular weight between 10,000 and 500,000.

6. A bead according to claim 2, wherein said crosslinking agent is selected from the group consisting of glycerol, ethylene glycol, 1,2-propanediol, 1,3-propanediol, and mixtures thereof.

7. A bead according to claim 6, wherein said crosslinking agent is glycerol.

8. A bead according to claim 1, wherein said activated carbon is bituminous coal-based activated carbon.

9. A bead according to claim 1, wherein said activated carbon is powdered carbon with a particle size smaller than 100 mesh.

10. A bead according to claim 1, wherein said binder is polyamine, said polyamine binder being effectively crosslinked with a crosslinking agent, said crosslinking agent being a dicarboxylic acid.

11. A method of making a metal-ion-sorbing bead, said bead being effective to sorb metal ions from a dilute aqueous solution, said metal being selected from the group consisting of silver, iron, chromium, cobalt, uranium, mercury, nickel, aluminum, cadmium, lead, manganese, copper, and zinc, the method comprising the steps of;

a) combining activated carbon and a binder solution into a mixture, said binder solution comprising a binder and a crosslinking agent, said binder being selected from the group consisting of poly(carboxylic acids) and polyamines;

b) forming the mixture into a first bead comprising 65–94 weight percent activated carbon and 4–25 weight percent binder; and c) heating said first bead to effectively crosslink said binder with said crosslinking agent to form an effectively crosslinked binder.

12. A method according to claim 11, wherein said binder is poly(carboxylic acid) and said crosslinking agent is a polyalcohol or a mixture of polyalcohols.

13. A method according to claim 11, wherein said poly(carboxylic acid,) is selected from the group consisting of poly(acrylic acid), poly(methacrylic acid), and mixtures thereof, and wherein said crosslinking agent is selected from the group consisting of glycerol, ethylene glycol, 1,2-propanediol, 1,3-propanediol, and mixtures thereof.

14. A method according to claim 13, wherein said poly(carboxylic acid) is poly(acrylic acid) and said crosslinking agent is glycerol.

15. A method according to claim 11, wherein said binder is polyamine and said crosslinking agent is dicarboxylic acid.

16. A method according to claim 15, wherein said polyamine is polyethyleneimine and said crosslinking agent is glutaric acid.

17. A method according to claim 11, wherein said heating takes place in a convection oven.

18. A method according to claim 11, wherein said heating is by radio frequency heating.

19. A method according to claim 11, wherein said forming of said mixture is by use of a pin mixer.

20. A bead according to claim 1, said bead having a diameter of 0.3–1 mm.

21. A method according to claim 11, said binder solution comprising 60–98 weight percent water, 2–40 weight percent poly(carboxylic acid), and 0.1–15 weight percent crosslinking agent.

22. A bead according to claim 10, wherein said binder is polyethylenimine and said crosslinking agent is glutaric acid.

23. A bead according to claim 22, said polyethyleneimine having a molecular weight of 60,000–100,000.

24. A bead according to claim 1, wherein said activated carbon is granular carbon with a particle size of 40–80 mesh.

25. A bead according to claim 5, wherein said poly(acrylic acid) has a molecular weight between 200,000 and 300,000.

26. A bead according to claim 9, wherein said powdered carbon has a particle size smaller than 325 mesh.

* * * * *

UNITED STATES PATENT AND TRADEMARK OFFICE
CERTIFICATE OF CORRECTION

PATENT NO.     : 6,395,678 B1
DATED          : May 28, 2002
INVENTOR(S)    : Summers, Jr. et al.

Page 1 of 1

It is certified that error appears in the above-identified patent and that said Letters Patent is hereby corrected as shown below:

<u>Title page,</u>
Item [56], References Cited, OTHER PUBLICATIONS, the reference beginning with KX Industries, L.P., MATRIKX Pbl, please delete "Date: 1996" and insert therefor -- Date: Fourth Quarter 1996 --.

<u>Column 3,</u>
Line 7, please delete "75-85%" and insert therefor -- 75-95%, more preferably about 80-85% --.
Line 40, please delete "5-40% preferably" and insert therefor -- 5-40% more preferably --.
Line 43, starting with "The invention is preferably", please begin a new paragraph.

<u>Column 4,</u>
Line 41, please delete "fore" and insert therefor -- form --.

<u>Column 6,</u>
Line 13, starting with "The disclosed poly(carboxylic acid) bead", please begin a new paragraph.
Line 17, please delete "higher," and insert therefor -- higher --.

<u>Column 7,</u>
Line 4, starting with "The", please begin a new paragraph.

<u>Column 8,</u>
Line 22, starting with "It is also possible to run the", please begin a new paragraph.

Signed and Sealed this

Twenty-first Day of January, 2003

JAMES E. ROGAN
*Director of the United States Patent and Trademark Office*